Inventors
Oscar J. Cooper
Alfred H. Filskov, Jr.
John A. King
BY
ATTORNEY

United States Patent Office 3,535,530
Patented Oct. 20, 1970

3,535,530

TIMING MODULE FOR SELECTIVELY ENERGIZING AND DEENERGIZING INDUCTIVE LOADS

Oscar J. Cooper, Alfred H. Filskov, Jr., and John A. King, Dallas, Tex., assignors to Texas Instruments Incorporated, Dallas, Tex., a corporation of Delaware Filed Dec. 21, 1967, Ser. No. 692,404
Int. Cl. H01j *31/50*
U.S. Cl. 250—214 9 Claims

ABSTRACT OF THE DISCLOSURE

Disclosed is a timing control constructed in integrated circuit form and mounted in a miniature module, the control being usable, for example, as a camera shutter control, wherein a light sensitive cell determines the time that the camera shutter is to be open depending upon the amount of light impinging upon the light sensitive cell.

Figure 1:
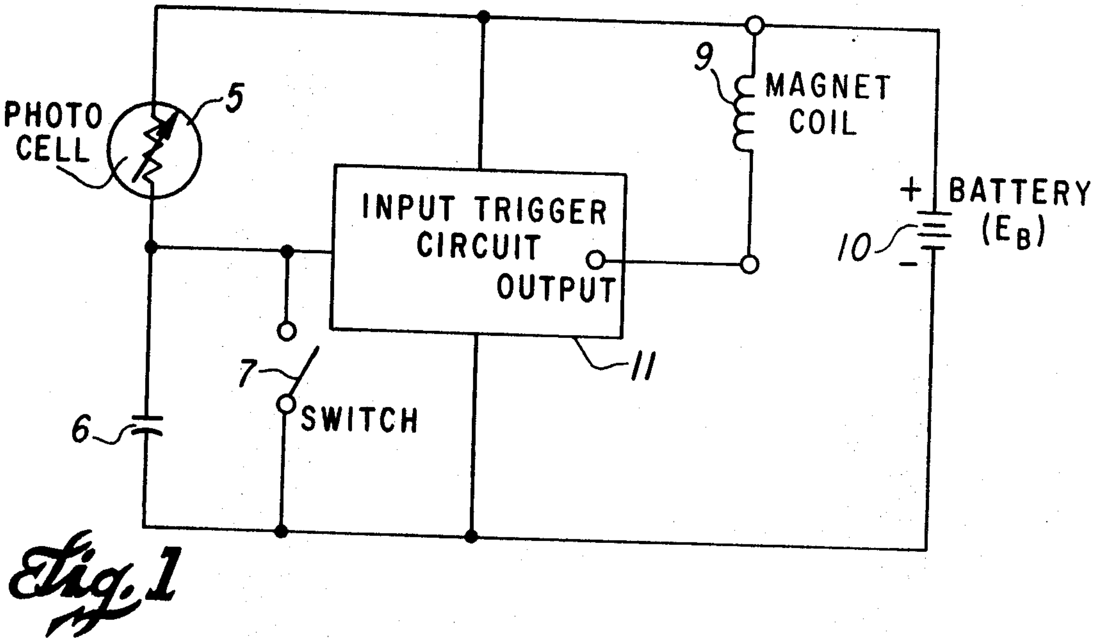

Camera controls generally consist of a system of mechanical linkages and a photocell which has a resistance which changes with a change in light intensity. Resistance changes in this system increases or decreases current through a galvanometer movement which is connected to diaphragm blades. Movement of the blades opens or closes the aperture of the camera, thereby determining the amount of light reaching the film.

Some cameras use a variable time approach wherein the aperture is fixed and the time of travel of the shutter across an aperture is variable.

These prior systems are usually large and bulky and have a large number of piece parts which affect reliability. Mechanical wear can cause an inaccurate exposure and require operator corrections to compensate for various types of film.

Prior art patents such as U.S. Pats. 3,063,354 and 3,336,850 deal primarily with the camera shutter mechanisms, and do not relate to hermetically sealed integrated circuit modules for use as timing controls as described herein.

The present invention is a modular type integrated circuit timing control which is sealed as a single unit and which may be easily installed within a camera shutter mechanism. The basic function of the module may be subdivided in two parts; (1) the input or trigger circuit, and (2) the output circuit. Each of these circuits has its own specific characteristics and requirements.

The function of the input circuit is to switch, or trigger, at a fixed voltage level as a rising ramp voltage is supplied to the input terminal. This rising voltage ramp is generated by charging a capacitor through a photocell. Since the resistance of the photocell varies directly with the amount of light impinging thereon, the slope or rate of rise of the voltage ramp also varies directly with the light level. When the voltage ramp reaches a specific level, the input circuit switches. The time required for the voltage ramp to reach a trigger voltage establishes the exposure time. The actual voltage at which the circuit switches is a function of the circuit components.

The photocell resistance, timing capacitor and battery supply voltage determine the slope of the voltage ramp. The time required to trigger the input circuit is a function of both the trigger voltage level and the ramp voltage, therefore trigger and time adjustments may be accomplished by several means, for example, any factors affecting the rising voltage level, increasing photocell resistance, capacitance value or lower battery supply of voltage.

The output circuit is so arranged that it holds the shutter mechanism in an on condition until the time the input circuit triggers. The shutter mechanism may be, for example, held in place by an electromagnet and then returned to an off position by a spring upon deenergizing the electromagnet.

The length of time that the shutter is open is determined by the charging rate of the capacitor and the release time of the electromagnet. The shutter may be opened at the same time the charging is initiated and closed as soon as the triggering level has been reached. By this means, the amount of light which passes through the shutter may be directly related to the amount of light impinging upon the photocell.

It is therefore an object of the invention to provide a modular type integrated circuit timing circuit for use with cameras or other applications when timing is a function of light or other sensing devices.

Another object of the invention is to provide a miniature hermetically sealed triggering circuit which may be incorporated into the shutter mechanism of the camera.

One feature of the invention is a timing circuit which is incorporated into a transistor type header along with the photocell to form a hermetically sealed timing module.

Figure 2:
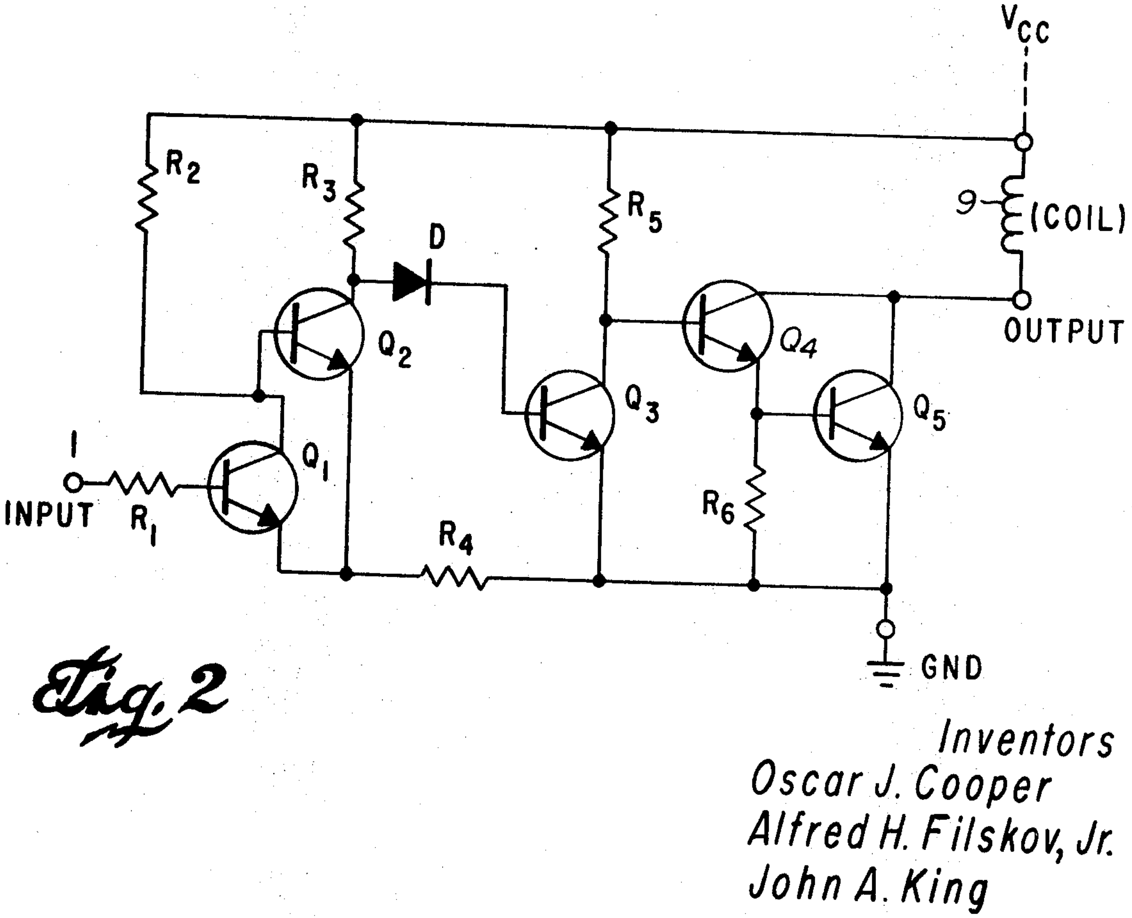
Figure 3:
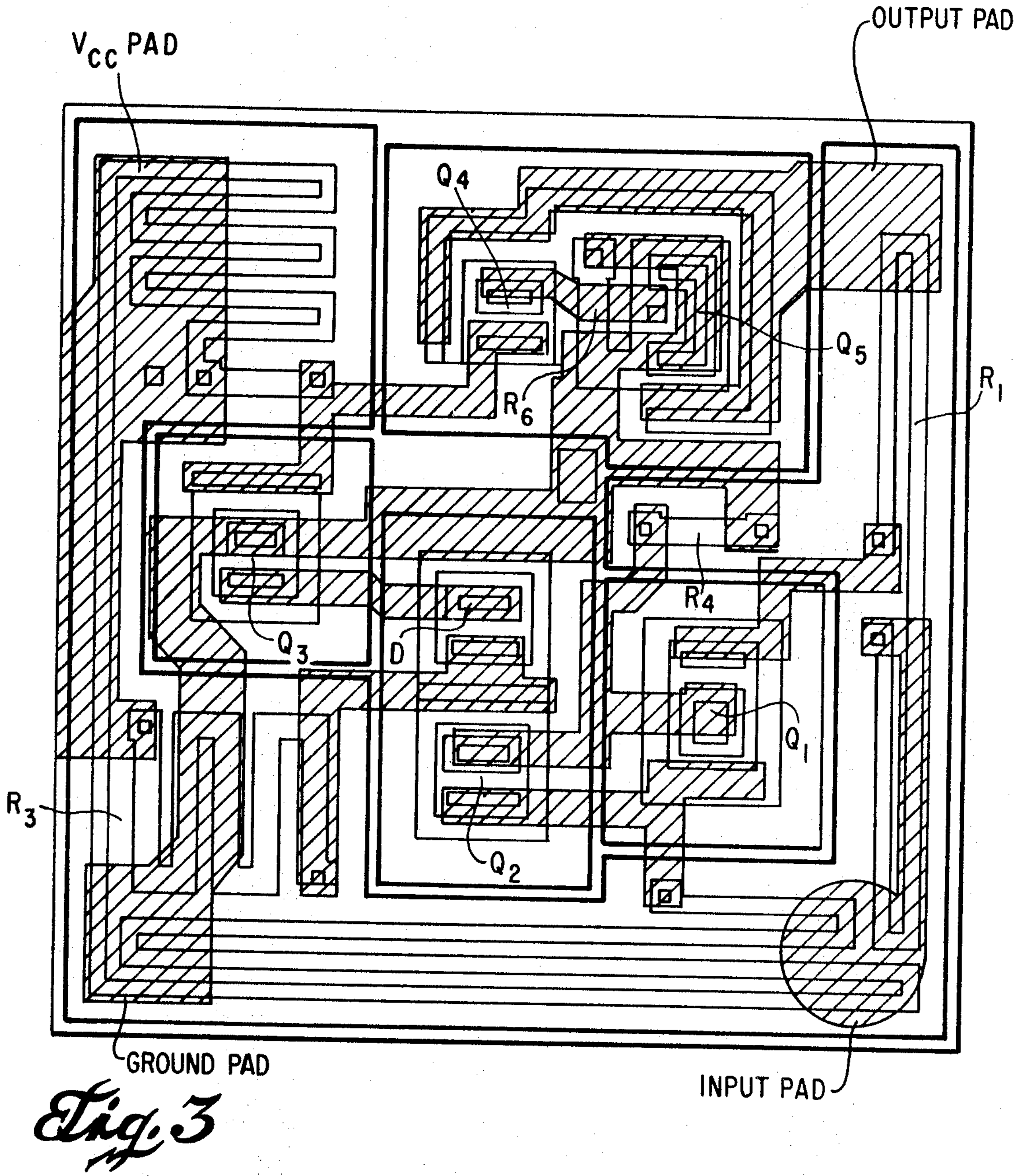
Figure 4:
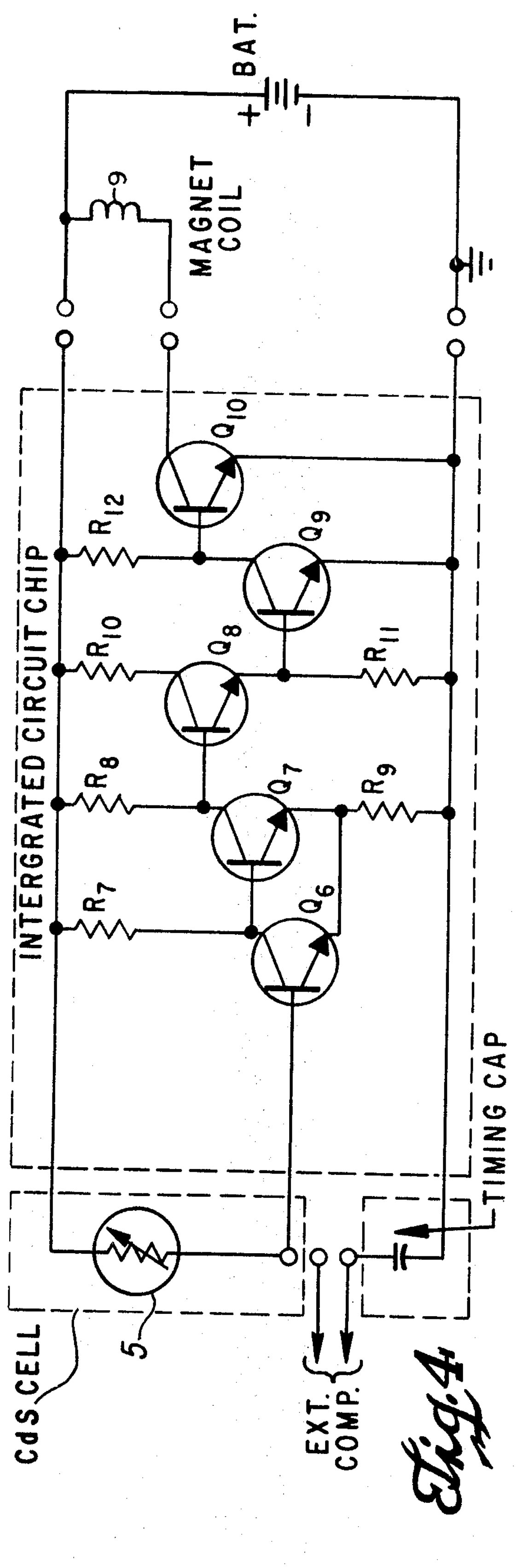
Figure 5:
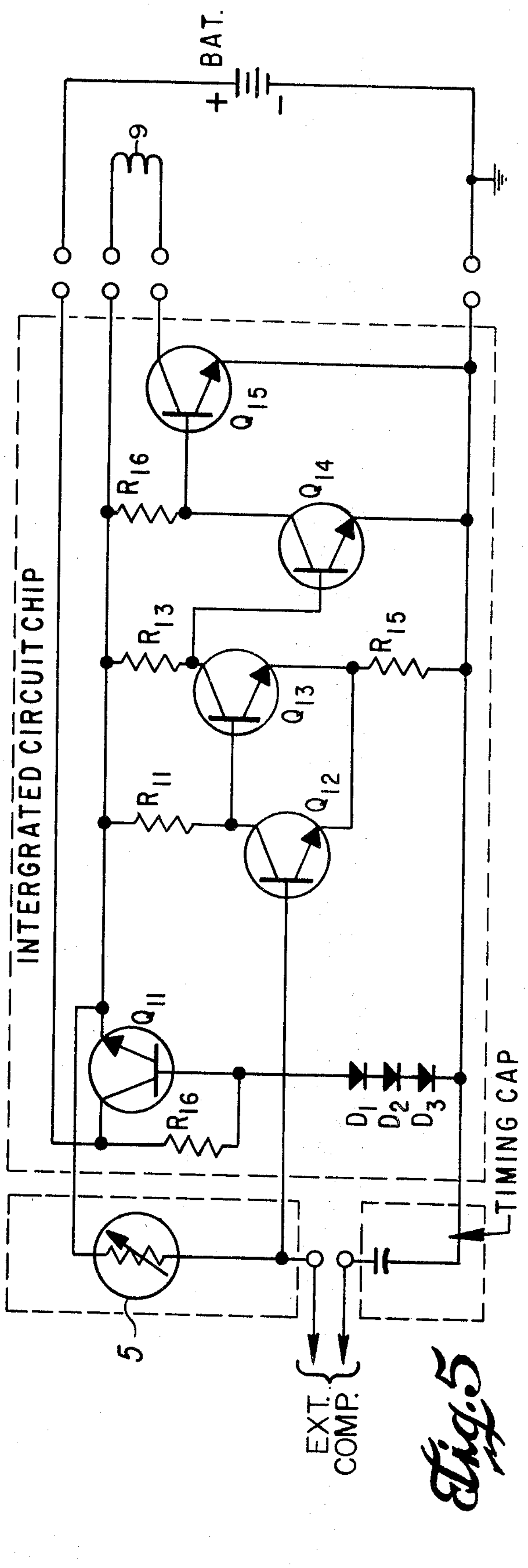
Figures 6, 7:
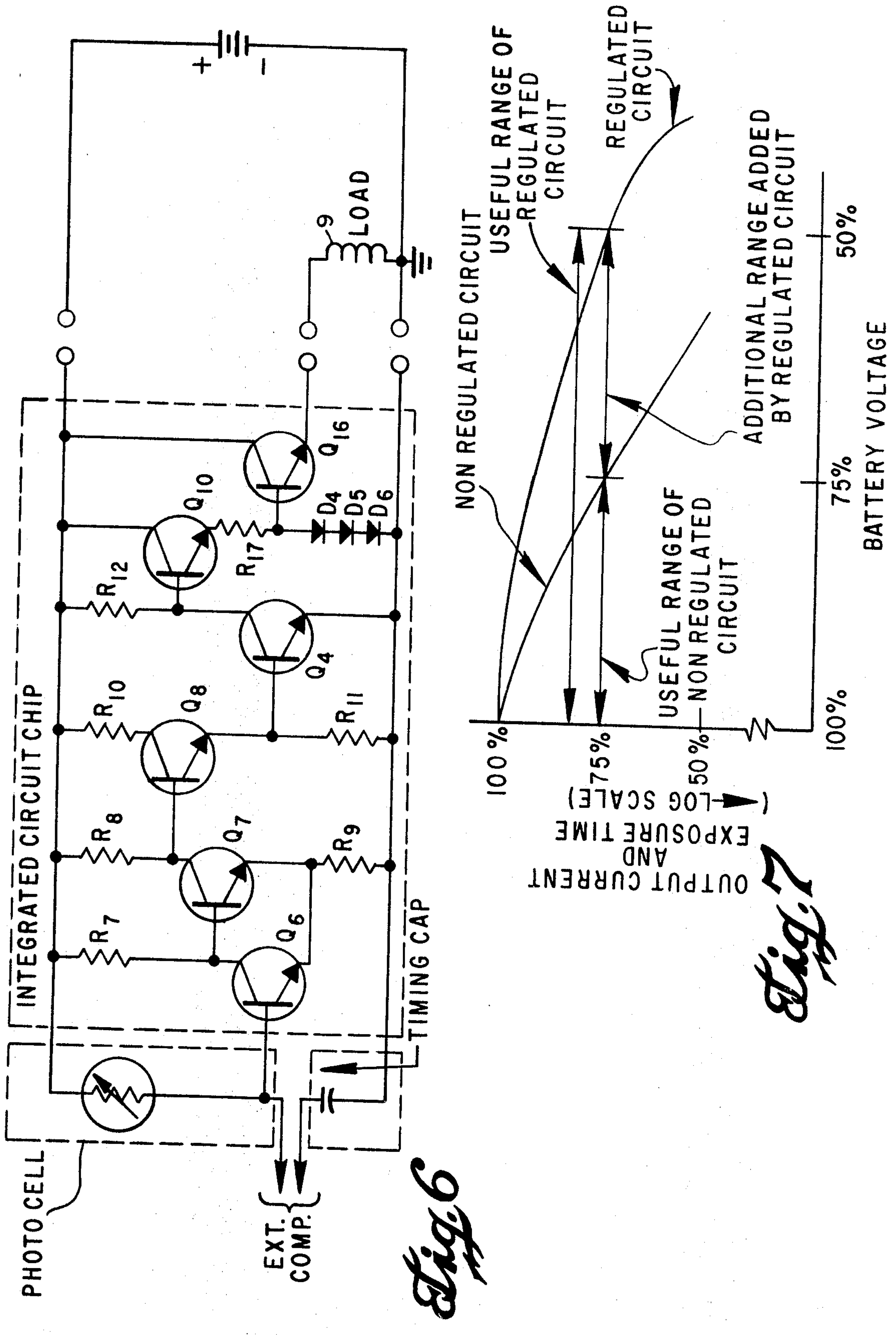
Figure 8:
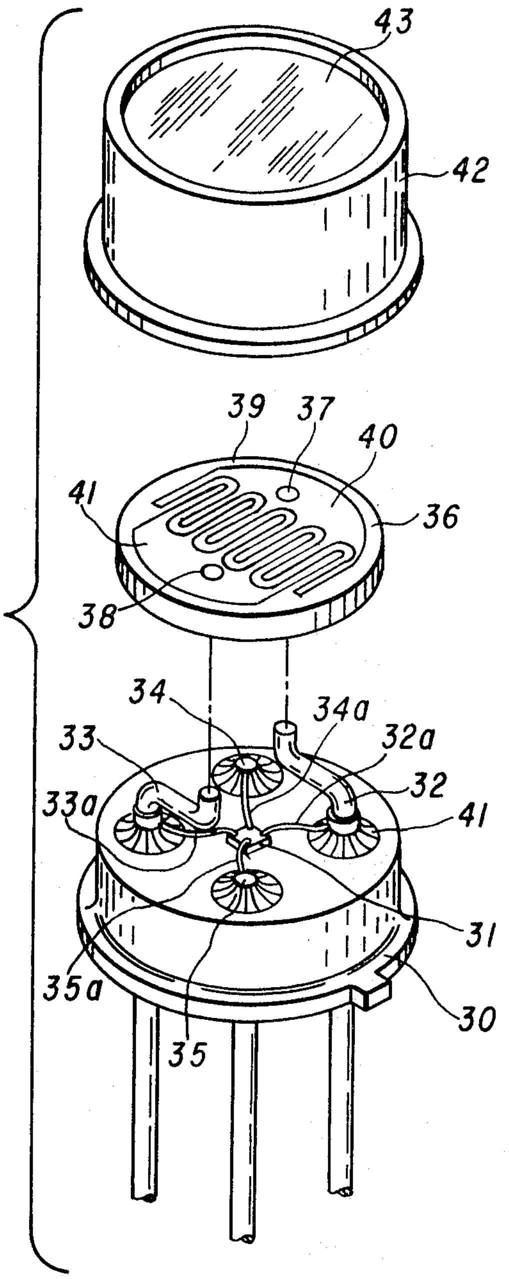

Other objects and features of the invention will be apparent from the following detailed description taken in conjunction with the appended claims and the attached drawings in which:

FIG. 1 is a circuit diagram of a timing circuit, showing the charging circuit, the magnetic coil circuit connected to the control circuit and the control circuit in blocked diagram form, FIG. 2 is a circuit diagram of one embodiment of a circuit which may be used for the input and output circuitry of the timing module, FIG. 3 is a layout for an integrated circuit module of the circuit shown in FIG. 2, FIG. 4 is another embodiment for the input-output circuit for the timing control, FIG. 5 is a circuit diagram similar to that of FIG. 4 with a regulator circuit added to the input thereof, FIG. 6 is the timing circuit of FIG. 4, with a regulator circuit added to the output thereof, FIG. 7 is a graph illustrating the effects of output current versus battery voltage for regulated and nonregulated circuits, FIG. 8 is an exploded pictorial view of the timing module showing placement of integrated circuit and the photocell.

Figure 9:
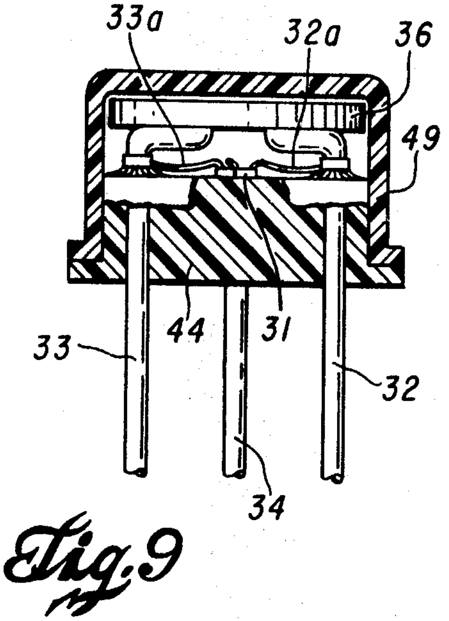
Figures 10A, 10B:
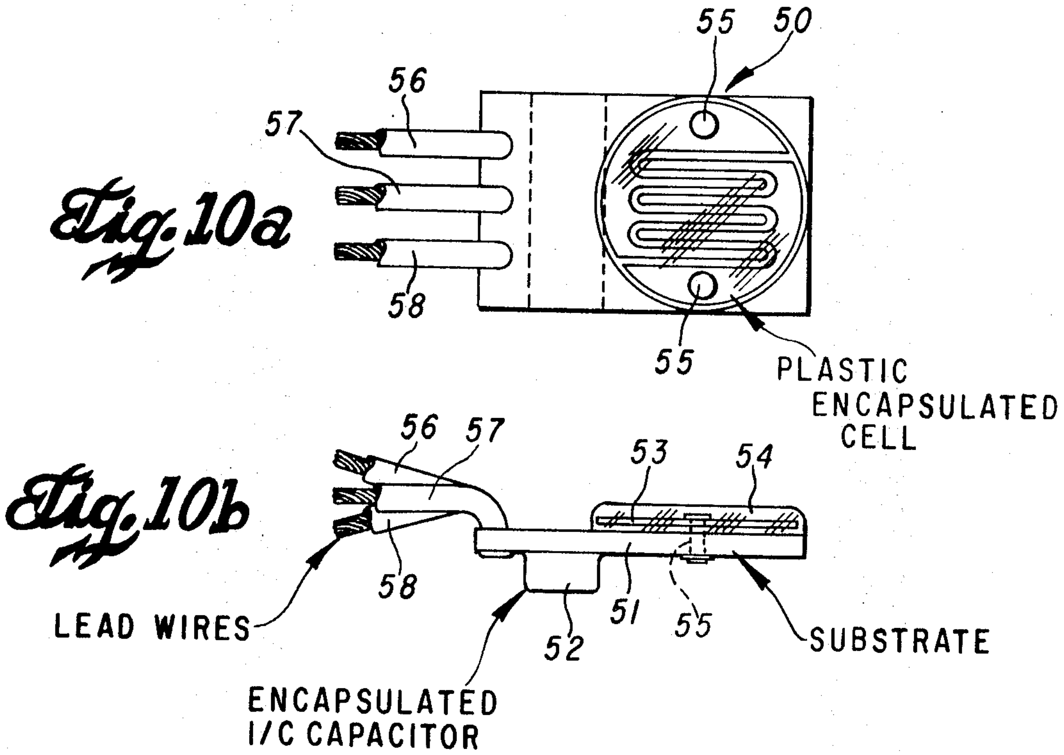
Figure 10C:
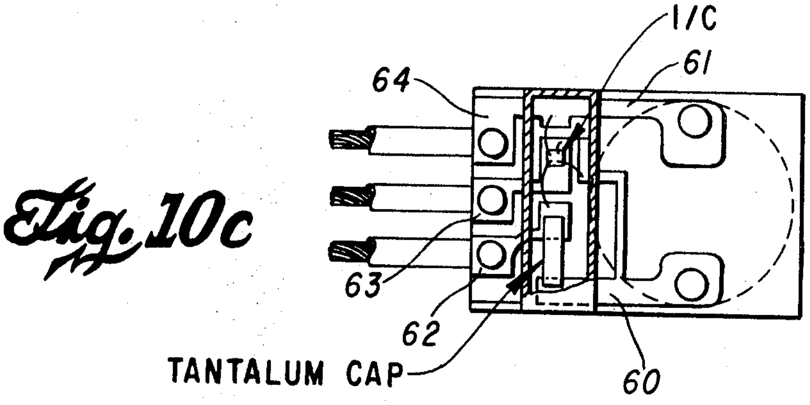

FIG. 9 is a cross sectional view of a module similar to that shown in FIG. 8, except that the mounting base and cover are of epoxy material or plastic, FIGS. 10*a*, 10*b* and 10*c* is another embodiment of an encapsulated timing circuit module.

Referring to the figures, there is shown in FIG. 1 a basic timing circuit in which photocell 5, when exposed to light, charges capacitor 6. Charging commences when switch 7 is opened. When the charge on capacitor 6 reaches a predetermined level, the input trigger circuit turns off an output circuit which de-energizes magnetic coil 9, thereby actuating the shutter on a camera (not shown), battery 10 supplies power for the switching circuits and for the charging current.

The basic timing circuit has the following general relationship:

$$t = \ln\left(\frac{E_B E_T}{E_B}\right) RC$$

where $t$=time in seconds
$E_B$=battery voltage in volts
$E_T$=input circuit trigger voltage level
R=photocell resistance in ohms
C=timing capacitance in farads Because existing films and photocell resistances exhibit nonlinear characteristics with varying light levels, an RC-generated voltage ramp requires additional compensation at the very low and very high levels to insure proper film exposure. This characteristic is commonly referred to as non-reciprosity and can be compensated. Correction at high light levels is provided by a pre-bias condition set on the timing capacitor. At low light levels, compensation is provided by parallel RC circuits in the timing network. Only a single timing capacitor is required if electrical compensation for non-reciprocity is not necessary. As pointed out above, the output circuit is arranged so that it holds the shutter electromagnetic in the on condition until the time at which the input circuit triggers. From this point the electromagnetic must release the shutter within a specified time. The release time is a function of the speed at which the stored electrical energy may be removed from the magnetic coil. Exposure time varies directly with the resistance and capacitance, therefore a tolerance variation of resistance between photocells affects the exposure time by the same percentage variation.

The circuit shown in FIG. 2 is one embodiment of the timing circuit represented by the block in FIG. 1. The circuit may be considered to consist of an input section containing transistors $Q_1$ and $Q_2$ and an output section consisting of transistors $Q_3$, $Q_4$ and $Q_5$. Transistor $Q_1$ and $Q_2$ form a Schmitt trigger circuit in which transistor $Q_2$ is operated in a saturated condition. The trigger voltage is equal to the voltage across resistor $R_4$ plus the base emitter voltage $V_{BE}$ of transistor $Q_1$. The voltage across resistor $R_4$ is primarily a function of the ratio of resistor $R_3$ and $R_4$. The only variation in this circuit is the saturation voltage across transistor $Q_2$ which is small compared to the voltage across resistor $R_4$. The saturation voltage of a monolithic transistor will not vary significantly from slice and slice and from bar to bar, therefore providing uniformity which results in a voltage at the emitter of transistor $Q_2$ which is dependent on the resistor ratios and is fairly independent of other parameters. For a given manufacturing process and a fixed transistor geometry, the $V_{BE}$ of a transistor is a fairly well controlled parameter. The input circuit therefore provides a trigger voltage which is quite predictable and consistent from one device to another.

The output transistor $Q_5$ is operated in a nonsaturated condition by virtue of the fact that transistor $Q_4$ is saturated. This is explained as follows:

In order for transistor $Q_5$ to saturate, the collector to base voltage must be zero or negative. If it is assumed that transistor $Q_4$ is saturated (which it is since its base voltage is $V_{BE5}+V_{BE4}$ or approximately 1.2 v., and its collector voltage is $V_{BE5}+V_{sat4}$ or 0.9 v.) the collector-base voltage of transistor $Q_5$ is never lower than $V_{sat}$ of transistor $Q_4$. This output configuration provides two important functions for the operation of the shutter holding magnet: (1) it never allows the output stage to saturate and provides minimum switching time, and (2) it limits the variation in output current by limiting the change in voltage drop from the collector of transistor $Q_5$ to ground, thus limiting the change of voltage across the magnet coil. Transistor $Q_3$ operates as a switch and shorts the base of transistor $Q_4$ to ground when transistor $Q_3$ conducts. This causes the output current to turn off. Transistor $Q_3$ is normally off and is driven on when the input trigger voltage is reached at the base of transistor $Q_1$.

With a minimum transistor $h_{FE}$ of 30 to 35, the circuit will switch with a photocell resistance in excess of about 0.5 ohm. A very important design criteria for the input device transistor $Q_1$ is that it must have a high $h_{FE}$ at very low currents since it is turning on from zero collector current as the trigger voltage is approached at its base.

FIG. 3 is a layout of an actual integrated circuit design. The actual chip size is about 0.035 inch square. Corresponding elements of FIG. 2 are shown in FIG. 4. The shaded areas are the interconnections for the device which overlie an oxide or insulating layer, which is placed on the surface of the integrated circuit chip prior to the formation of the metallized interconnections.

The circuit shown in FIG. 4 is similar to the circuit shown in FIG. 2. The relationship between the integrated circuit chip and the capacitor and photocell charging circuit is shown. Transistors $Q_6$ and $Q_7$ form a Schmitt trigger and are biased by resistors $R_7$, $R_8$ and $R_9$. Transistor $Q_8$ is an emitter follower and couples the switching signal from the Schmidt trigger to drive transistor $Q_9$. Resistors $R_{10}$ and $R_{11}$ biased transistor $Q_8$. The switching signal is developed across $R_{11}$ and turns transistor $Q_9$ on. When transistor $Q_9$ is turned on, transistor $Q_{10}$ is turned off, thereby de-energizing the magnet coil.

Since photographic timing modules are usually battery powered, variations in operation of the timing circuit may occur as the battery gets older and its output voltage begins to drop. This has two major effects: (1) decreasing the supply voltage lengthening the charging time of the timing capacitor, thereby increasing exposure time of the module, and (2) decreasing the battery voltage lowers the output voltage and current.

Some compensation for (1) above is built into the module circuit, as shown in FIG. 4 through resistor $R_9$. As the battery voltage changes, the drop across $R_9$ changes proportionately. This changes the input trigger voltage to the same extent as the change on resistor $R_9$. Since the voltage change at resistor $R_9$ is proportional to $$\left[\text{battery voltage change} \times \frac{R_3}{R_2+R_3}\right]$$

it can never change the same amount as the battery, therefore only part compensation exists.

FIG. 5 shows FIG. 4 with the addition of regulation in the supply voltage line. Another difference is that the output stage transistors $Q_{14}$ and $Q_{15}$ are not isolated from the Schmitt trigger circuit comprised of transistors $Q_{12}$ and $Q_{13}$ and resistors 13, 14 and 15 by an emitter follower circuit.

The forward biased diodes $D_1$, $D_2$ and $D_3$ hold the base of transistor $Q_{11}$ at a fairly constant potential. Transistor $Q_{11}$ serves as an emitter follower with the emitter potential held at the base potential less the voltage drop of the transistor from base to emitter. Since the base-emitter drop is also fairly constant, the emitter voltage, which is the circuit supply voltage, remains fairly constant as long as transistor $Q_{11}$'s collector voltage (battery voltage) remains above the base voltage. By regulating the supply voltage, the useful range of operation of the circuit can be increased by over 50%, as shown in FIG. 7. It should be noted that without regulation the circuit is useful only when the battery voltage is above 75% of its rated value. However, with regulation, the circuit will operate until the voltage has fallen to about 50% of the battery rated voltage.

The circuit shown in FIG. 4 may be further modified and regulated as shown in FIG. 6. In the circuit shown in FIG. 6, the output is regulated, rather than the supply voltage. An advantage of this circuit is that a high output voltage may be obtained and thereby a lower current is used to supply the load with the same power. Lower current would provide longer battery life and permit the use of smaller circuit components; however, one disadvantage over the regulation of the supply voltage is that there is no regulation of exposure time. In FIG. 6, diodes 4, 5 and 6 bias the base of transistor $Q_{16}$, and the load is taken from the emitter of transistor $Q_{16}$ rather than from the collector of transistor $Q_{10}$.

In order to protect the circuit and to provide a mounting therefor, the integrated circuit wafer may be placed in an enclosure, for example, similar to the one shown in FIG. 8. This enclosure is a standard semiconductor package and is designated as a TO–5 package. The wafer 31 is mounted on the header base 30, and interconnected with wires 32, 33, 34 and 35 with connection wires 32*a*, 33*a*, 34*a* and 35*a* respectively. A photocell, for example, a cadmium sulfide cell, 36 is attached to the header base by placing the photocell on wires 32 and 33 and inserting the ends thereof into openings 37 and 38 in the cell. The cell is divided into two active regions 40 and 41 by region 39. The photocell and wafer may then be enclosed by the lid 42 which has a transparent top 43 mounted thereon. Mounting base 30 may be, for example, metal with the lead wires insulated from the base 30 by glass. Lid 42 may be secured to the base 30 forming a hermetic seal therewith.

Another package is shown in FIG. 9; however, in this instance the base 44 may be, for example, a plastic or an epoxy material with the cover 49 also being plastic with the top portion thereof being transparent to light.

Another type encapsulation is shown in FIGS. 10*a*, 10*b*, and 10*c*. In this configuration, a photocell 53 is mounted on one side of a substrate 51 and an integrating circuit and timing capacitor is mounted on the other side thereof. The photocell 53 is secured to the substrate by pins 55 and is interconnected with the circuitry and output leads 55, 56 and 58 by the metallization patterns 61. The leads are connected to the substrate by a metallization pattern 62, 63 and 64. After the photocell is secured to the substrate it is covered by a clear plastic or epoxy 54. The integrated circuit and timing capacitor are encapsulated with an epoxy material 52. In this manner a package is made which is thinner than the enclosure shown in FIGS. 8 and 9, but covers a larger surface area. The substrate 51 may be ceramic or a type of phenolic board used in the manufacture of printed circuits. The metallization 60, 61, 62, 63 and 64 may be either deposit metal films or copper laminations.

Although the present invention has been shown and illustrated in terms of a specific preferred embodiment it will be apparent that changes and modifications are possible without departing from the spirit and the scope of the invention as defined in the appended claims.

What is claimed is:

1. A timing module for selectively energizing and de-energizing an inductive load for a time period that varies in proportion to the amount of light impinging upon a photosensitive device, comprising in combinations:

(a) a timing circuit including a photo-sensitive device and a storage device in series relationship across a voltage source for developing a predetermined voltage across said storage device within said time period;

(b) an input trigger circuit for developing a switching signal when said predetermined voltage level is developed across said storage device, said input trigger circuit being connected across said voltage source and having its input connected to the junction of said photosensitive and storage devices;

(c) an output switching circuit for selectively energizing an inductive load and for de-energizing said inductive load at the end of said time period, said output switching circuit being connected across said voltage source and having its output connected to said inductive load, and including a transistor connected to said inductive load and operated in a nonsaturated condition when said inductive load is energized; and (d) transistor switching means coupling said switching signal from said input trigger circuit to said output switching circuit for de-energizing said inductive load at the end of said time period.

2. The timing module of claim 1 wherein:

(a) said transistor switching means for coupling said switching signal to said output switching circuit is an emitter-follower circuit connected across said voltage source for isolating said input trigger and output switching circuits; and wherein (b) said emitter-follower has its base connected to the output of said input trigger circuit and its emiter connected to the input of said output switching circuit.

3. The timing module of claim 1 and further including:

(a) a constant current circuit for regulating said supply voltage; wherein (b) said constant current circuit is connected between said timing circuit and said input trigger circuit so that said time period is substantially independent of variations in said voltage supply.

4. The timing module of claim 1 and further including:

(a) a constant current circuit for regulating the output voltage of said output switching circuit; wherein (b) said constant current circuit is connected between said output switching circuit and said inductive load so as to provide a relatively high output voltage for energizing said inductive load.

5. The timing module of claim 1 wherein:

(a) said storage device is a capacitor; and wherein (b) said photosensitive device is a photosensitive resistor that varies in value in proportion to the amount of light that impinges upon it; and wherein (c) said time period is an RC time period established by said photosensitive resistor and capacitor.

6. The timing module of claim 1 wherein (a) said input trigger circuit, output switching circuit and transistor switching means are integrated in a semiconductor wafer.

7. The timing module of claim 6 wherein:

(a) said semiconductor wafer is mounted on a header base and interconnected by lead wires to said photosensitive device; and wherein (b) said semiconductor wafer and photosensitive device are enclosed by a lid having a top surface with at least a portion thereof transparent and hermetically sealed therein.

8. The timing module of claim 7 wherein:

(a) said header base and lid are plastic with said lid having at least a portion thereof transparent.

9. The timing module of claim 6 wherein:

(a) said semiconductor wafer is mounted on one surface of a support substrate and said photosensitive device is mounted on the other surface of said substrate; and wherein (b) said semiconductor wafer and photosensitive device are encapsulated with an epoxy material, with said epoxy material having at least a portion thereof transparent.

References Cited

UNITED STATES PATENTS

| | | | |
|---|---|---|---|
| 3,299,789 | 1/1967 | Chandler et al. | |
| 3,363,967 | 1/1968 | Schmitt. | |
| 3,383,566 | 5/1968 | Ciemniak et al. | |
| 3,417,253 | 12/1968 | Kadah et al. | 250—239 X |
| 3,433,140 | 3/1969 | Wick et al. | |
| 3,362,309 | 1/1968 | Cooper et al. | |

(Other references on following page)

UNITED STATES PATENTS

| | | | |
|---|---|---|---|
| 2,232,373 | 2/1941 | Dorst. | |
| 2,274,158 | 2/1941 | Penther. | |
| 2,386,320 | 10/1945 | Kott. | |
| 2,546,734 | 3/1951 | Farber. | |
| 2,666,858 | 1/1954 | Levine. | |
| 2,757,317 | 7/1956 | Harlan. | |
| 3,062,092 | 11/1962 | Schmidt. | |
| 3,178,621 | 4/1965 | Glickman ---------- | 250—211 |
| 3,233,111 | 2/1966 | Pike. | |
| 3,389,267 | 6/1968 | Acomsky ---------- | 250—211 |

OTHER REFERENCES

Solomon, L., Integrated Circuits, September 1964, Electronics World, vol. 75, No. 3, pp. 27–31.

Lancaster, D., Integrated Circuits—What's Available, November 1965, Electronics World, pp. 47–50.

ARCHIE R. BORCHELT, Primary Examiner

C. M. LEEDOM, Assistant Examiner

U.S. Cl. X.R.

95—10; 307—303